United States Patent
Hussain

(10) Patent No.: US 8,858,163 B2
(45) Date of Patent: Oct. 14, 2014

(54) VENTILATION INLET

(75) Inventor: Zahid M. Hussain, Derby (GB)

(73) Assignee: Rolls-Royce PLC, London (GB)

( * ) Notice: Subject to any disclaimer, the term of this patent is extended or adjusted under 35 U.S.C. 154(b) by 639 days.

(21) Appl. No.: 13/177,078

(22) Filed: Jul. 6, 2011

(65) Prior Publication Data

US 2012/0034068 A1 Feb. 9, 2012

(30) Foreign Application Priority Data

Aug. 4, 2010 (GB) .................................... 1013093.8

(51) Int. Cl.
| | | |
|---|---|---|
| F01D 25/08 | (2006.01) | |
| F02K 3/075 | (2006.01) | |
| F02C 6/06 | (2006.01) | |
| F02C 7/25 | (2006.01) | |
| F02C 9/18 | (2006.01) | |

(52) U.S. Cl.
CPC .................. *F02C 9/18* (2013.01); *Y02T 50/675* (2013.01); *F02K 3/075* (2013.01); *F02C 6/06* (2013.01); *F05D 2260/20* (2013.01); *F02C 7/25* (2013.01)
USPC .......................................... 415/116; 415/175

(58) Field of Classification Search
USPC ............ 415/116, 175; 137/15.1, 171; 138/37; 60/785, 782, 39.83, 226.1
See application file for complete search history.

(56) References Cited

U.S. PATENT DOCUMENTS

| | | | |
|---|---|---|---|
| 6,050,527 A | * | 4/2000 | Hebert et al. ................. 244/210 |
| 2002/0007859 A1 | * | 1/2002 | Ta et al. ......................... 138/37 |
| 2006/0102779 A1 | | 5/2006 | Campbell et al. |
| 2008/0112796 A1 | | 5/2008 | Coney et al. |
| 2008/0128557 A1 | | 6/2008 | Acheson et al. |
| 2010/0126182 A1 | | 5/2010 | Hoover et al. |
| 2010/0186825 A1 | * | 7/2010 | Lynch ............................ 137/13 |

FOREIGN PATENT DOCUMENTS

| | | |
|---|---|---|
| EP | 0 743 247 A2 | 11/1996 |
| FR | 2 936 778 A1 | 4/2010 |
| GB | 2 443 830 A | 5/2008 |
| GB | 2 444 632 A | 6/2008 |
| WO | WO 2009/100897 A1 | 8/2009 |

OTHER PUBLICATIONS

Search Report issued in British Application No. GB1013093.8 dated Nov. 24, 2010.
Dec. 13, 2013 Search Report issued in European Application No. 11 17 2843.

* cited by examiner

*Primary Examiner* — Edward Look
*Assistant Examiner* — Juan G Flores
(74) *Attorney, Agent, or Firm* — Oliff PLC

(57) ABSTRACT

A ventilation inlet comprising a ventilation pipe to receive flow from a first flow zone and to deliver the flow to a second flow zone; a divider arranged to divide a portion of the ventilation pipe into a static pressure zone and a total pressure zone; and a deflector arranged to direct flow from the total pressure zone at least partially across the static pressure zone to restrict delivery of the flow from the static pressure zone to the second flow zone dependent on the pressure of the flow in the first flow zone.

13 Claims, 6 Drawing Sheets

VENTILATION INLET

The present invention relates to ventilation inlet configurations. In particular, but not exclusively, it relates to a fire zone ventilation inlet for a gas turbine engine.

A gas turbine engine 10 is shown in FIG. 1 and comprises an air intake 12 and a propulsive fan 14 that generates two airflows A and B. The gas turbine engine 10 comprises, in axial flow A, an intermediate pressure compressor 16, a high pressure compressor 18, a combustor 20, a high pressure turbine 22, an intermediate pressure turbine 24, a low pressure turbine 26 and an exhaust nozzle 28. A nacelle 30 surrounds the gas turbine engine 10 and defines, in axial flow B, a bypass duct 32. The radially inner extent of the bypass duct 32 is defined by an annular inner wall 34. The annular inner wall 34 defines at least two exemplary fire zones, zone z2 and zone z3, that are axially separated by a barrier wall 36. Downstream of the barrier wall 36 there is an array of ventilation inlets 38 that are equi-angularly spaced around at least a portion of the circumference of the annular inner wall 34 to permit air to flow from the bypass duct 32 into fire zone z3 to ventilate and purge it.

Each ventilation inlet 38 has the form of a static pressure tapping, being a pipe directed radially so that it extends substantially perpendicularly to the flow through the bypass duct 32, as shown in FIG. 2. One problem with this arrangement of ventilation inlet 38 is that in order to meet certification requirements for minimum purge flow at all bypass flow rates, the ventilation inlet 38 has a comparatively large diameter. Thus at more favourable bypass flow rates an excessive amount of air is diverted from the bypass duct 32 into the ventilation inlet 38, thereby reducing the amount of air available to provide thrust through the exhaust nozzle of the bypass duct 32. This has a disadvantageous effect on specific fuel consumption and the propulsive efficiency of the engine 10.

It is known to provide a valve to regulate the amount of bypass flow diverted into the ventilation inlet 38. However, such valves are heavy (which is particularly critical for aerospace applications of a gas turbine engine), expensive and may be unreliable. Furthermore, they require active management via control processing which offers a further failure mode.

The present invention provides a ventilation inlet that seeks to address the aforementioned problems.

Accordingly the present invention provides a ventilation inlet comprising a ventilation pipe to receive flow from a first flow zone and to deliver the flow to a second flow zone; a divider arranged to divide a portion of the ventilation pipe into a static pressure zone and a total pressure zone; and a deflector arranged to direct flow from the total pressure zone at least partially across the static pressure zone to restrict delivery of the flow from the static pressure zone to the second flow zone dependent on the pressure of the flow in the first flow zone.

Advantageously, the ventilation inlet allows the flow delivered to the second flow zone to be passively restricted dependent on the pressure and flow rate in the first flow zone. A prior art ventilation inlet can be modified with ease to become a ventilation inlet according to the present invention so that it is possible to retrofit or modify ventilation inlets to obtain the benefits of the present invention.

The flow may be ventilation flow.

The ventilation pipe may be circular in cross-section. The divider may be semi-circular in cross-section. The divider may have a complementary shape to the ventilation pipe wall in the total pressure zone or may be a different shape. The divider may be straight in cross-section.

The divider may be angled at its end close to the first flow zone. Advantageously this directs flow into the ventilation pipe and makes the aperture of the total pressure zone more like a total pressure inlet. Alternatively the divider may be angled from its end close to the first flow zone to its other end. This configuration accelerates the flow through the total pressure zone.

The divider may extend towards but not meet the end of the ventilation pipe close to the first flow zone. Beneficially this enables the total pressure zone to recover total pressure.

The deflector may protrude into the ventilation pipe from a wall close to the total pressure zone and be spaced from the end of the divider. The deflector may protrude further into the static pressure zone than the divider.

The ventilation inlet may further comprise a fire zone ventilation inlet.

The present invention also provides a gas turbine engine comprising a ventilation inlet as described wherein the first flow one comprises a bypass flow duct.

The present invention will be more fully described by way of example with reference to the accompanying drawings, in which.

The present invention is described with respect to ventilating and purging a fire zone. However, it is to be understood that fire zones are specific examples of nacelle cavities that require purging and/or ventilation and that the specific description is not intended to be limiting of the claimed invention.

Figure 1:
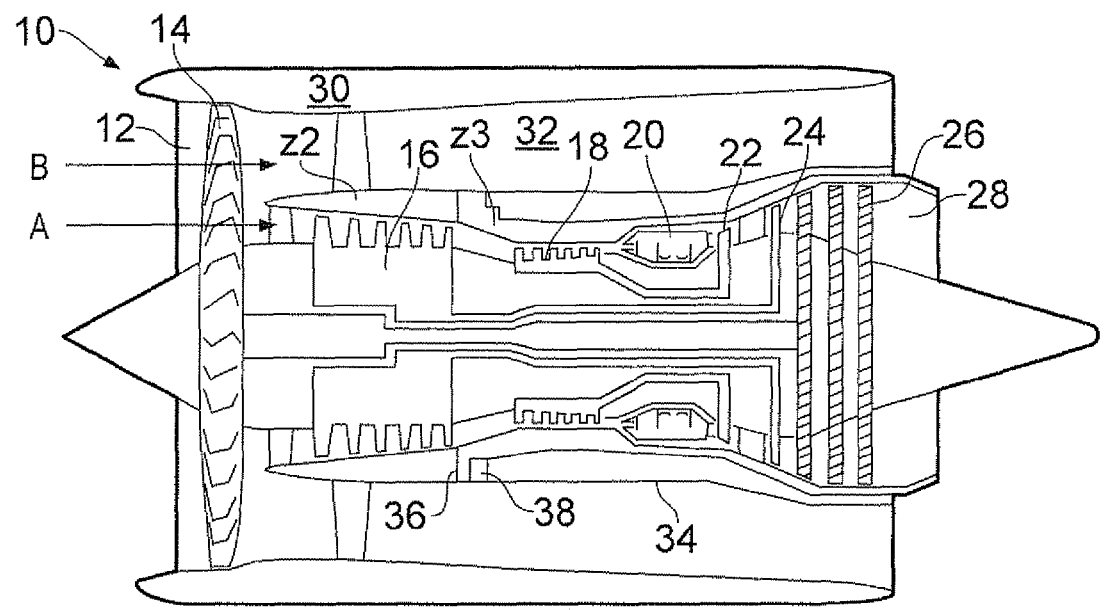
FIG. 1 is a sectional side view of a gas turbine engine.
Figure 2:
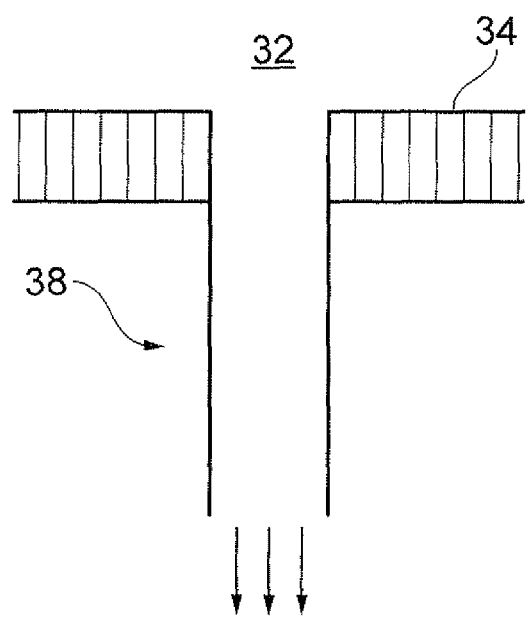
FIG. 2 is a sectional view of a prior art ventilation inlet.
Figure 3:
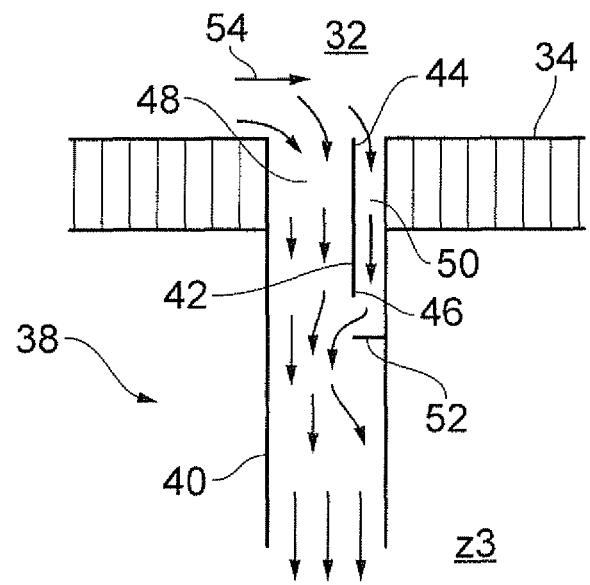
FIG. 3 is a sectional view of a ventilation inlet according to the present invention in a first flow state.
Figure 4:
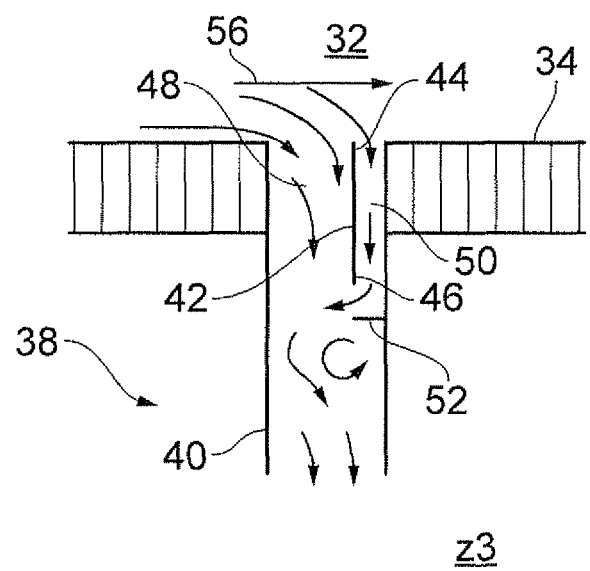
FIG. 4 is a sectional view of a ventilation inlet according to the present invention in a second flow state.

An exemplary embodiment of the present invention is shown in FIGS. 3 and 4. A portion of the annular inner wall 34 is shown that bounds the bypass duct 32. A ventilation pipe 40 extends through the inner wall 34 from the bypass duct 32 into fire zone z3 to form the ventilation inlet 38. The ventilation pipe 40 is a hollow tube, for example having circular cross-section, through which bypass air is diverted to provide purging and ventilation air to zone z3. The dimensions of the ventilation inlet 38 may be substantially the same as for prior art ventilation inlets 38. Thus the diameter is large enough that there is a region of higher pressure flow that forms against the downstream, trailing edge of the ventilation pipe 40 and a region of lower pressure flow that forms against the upstream, leading edge. Downstream and upstream are used relative to the flow through the bypass duct 32, left to right as illustrated in the figures. Thus although the ventilation inlet 38 is shaped as a static pressure inlet, the downstream portion tends to recover total pressure flow instead.

The ventilation inlet 38 according to the present invention also comprises a divider 42, having a first end 44 and a second end 46. The divider 42 extends inside the ventilation pipe 40, approximately parallel to the longitudinal axis of the ventilation pipe 40. Its first end 44 is located close to the junction between the ventilation pipe 40 and the inner wall 34 but preferably does not meet the end of the ventilation pipe 40. Thus, as illustrated, the first end 44 is below the level of the top of the ventilation pipe 40. The second end 46 is within the ventilation pipe 40, towards fire zone z3. However, the divider 42 is substantially shorter than the ventilation pipe 40 so that its second end 46 is well inside the ventilation pipe 40.

Figure 5:
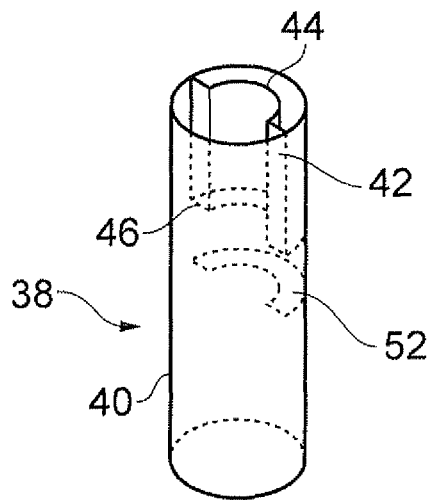
FIG. 5 is a perspective view of a ventilation inlet according to the present invention.
Figure 6:
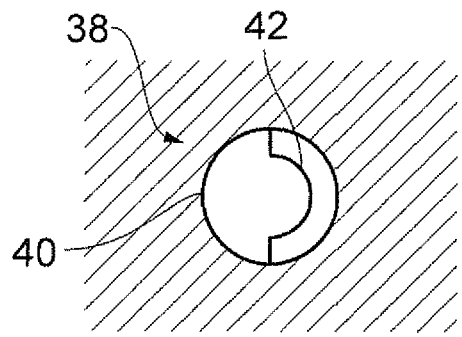
FIG. 6 is a plan view of the ventilation inlet of FIG. 5.

As shown in FIGS. 5 and 6, the divider 42 is semi-circular in cross-section and is of complementary shape to the downstream part of the wall of the ventilation pipe 40 so that its locus is upstream. The divider 42 also has a pair of wings that connect the semi-circular portion with the wall of the ventilation pipe 40 to divide that portion of the ventilation pipe 40 into two zones. The upstream zone is a static pressure zone 48 whilst the zone downstream of the divider 42 is a total pressure zone 50. The precise dimensions and the location of the divider 42 relative to the ventilation pipe 40 is a matter of optimisation for a specific application of the present invention.

Longitudinally displaced towards the fire zone z3 from the divider 42 is a deflector 52. The deflector 52 is arranged to extend from the downstream wall of the ventilation pipe 40 towards its longitudinal axis. It preferably has a complementary shape to the total pressure zone 50 as defined by the divider 42, thus part-annular as shown in FIG. 5. The deflector 52 extends at least as far into the ventilation pipe 40 as the position of the divider 42 and, in some applications, may extend further into the static pressure zone 48.

The deflector 52 is arranged to direct flow from the total pressure zone 50 at least partially across the static pressure zone 48 to restrict delivery of the flow from the static pressure zone 48 to the second flow zone, fire zone z3. FIG. 3 shows a first flow state in which the bypass flow is at a low pressure ratio as indicated by small arrow 54. Flow arrows in the ventilation pipe 40 show the flow paths for this first flow state. Thus some of the bypass flow 54 is diverted into the ventilation inlet 38 and a majority of that flow passes through the static pressure zone 48 upstream of the divider 42. A minority of the diverted flow passes through the total pressure zone 50 downstream of the divider 42 until it reaches the deflector 52. The deflector 52 alters the direction of the flow towards the static pressure zone 48. However, because the flow rate is low, the deflected flow forms only a weak air curtain which does not significantly restrict the flow from the static pressure zone 48 towards the end of the ventilation pipe 40 into the fire zone z3. Hence substantially all of the flow passes through the ventilation inlet 38 to ventilate and purge fire zone z3.

FIG. 4 shows a second flow state in which the bypass flow is at a high pressure ratio as indicated by large arrow 56. As in the first flow state, a majority of the flow diverted from the bypass duct 32 passes into the static pressure zone 48 and a minority of that flow passes into the total pressure zone 50. The flow through the total pressure zone 50 flows more quickly, because it is at a higher pressure than in the first flow state, so when it reaches the deflector 52 it is deflected to flow substantially in the direction of the deflector 52. Thus it flows across the static pressure zone 48 to form an air curtain that significantly restricts the air passing through the static pressure zone 48 from flowing further through the ventilation pipe 40 towards the fire zone z3. The deflected flow is deflected back into the previous flow direction either by reaching the upstream wall of the ventilation pipe 40 or by interaction with the flow through the static pressure zone 48, depending on the relative pressures in the flow. In the second flow state, therefore, the ventilation inlet 38 is restricted and a lower proportion of bypass air is able to flow into fire zone z3 to ventilate and purge it. Predominantly it is the flow through the total pressure zone 50 that flows into the second flow zone, fire zone z3, to ventilate and purge it.

It will be understood by the skilled reader that the first and second flow states illustrate substantially the extremes of flow behaviour through the ventilation inlet 38. In practical applications of the ventilation inlet 38 according to the present invention, there will be a continuum between the first and second flow states that will depend upon the flow pressure 54, 56 in the bypass duct 32 which will allow between substantially all of the diverted flow to pass into fire zone z3 and only that flow that has passed through the total pressure zone 50 to pass into fire zone z3 to purge and ventilate it. Advantageously, the ventilation inlet 38 of the present invention ensures that at no flow state is an excess purge flow diverted from the bypass duct 32. This improves the efficiency and therefore the specific fuel consumption of the engine compared to prior art arrangements.

The ventilation inlet 38 according to the present invention is a passive system to regulate the amount of air that passes through it, based on the flow pressure entering the ventilation inlet 38. Beneficially therefore, there are no moving parts unlike in active arrangements so that there is no failure mode that can result in no purge or ventilation air being provided to fire zone z3. Additionally, the divider 42 and deflector 52 add little weight to the ventilation inlet 38, which is advantageous for aero gas turbine engine applications, and do not add significantly to the cost of the ventilation inlets 38. Furthermore, since the divider 42 and deflector 52 are fixed into a ventilation pipe 40 having substantially the same dimensions as the prior art ventilation inlet 38, the divider 42 and deflector 52 may be retrofitted to extant ventilation inlets 38 to obtain the benefits of the present invention with minimal expenditure or modification.

Figure 7:
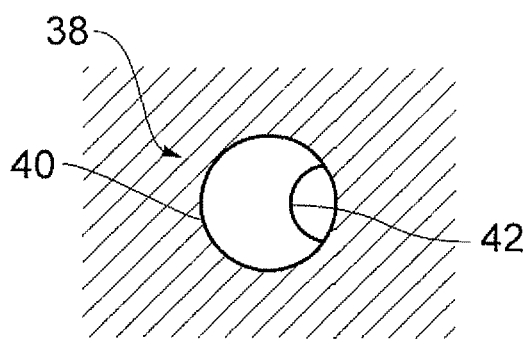
FIG. 7 is a plan view of an alternative ventilation inlet.

FIG. 7 shows an alternative embodiment of the ventilation inlet 38 according to the present invention. In this embodiment the divider 42 does not have complementary shape to the downstream portion of the wall of the ventilation pipe 40. Instead the divider 42 is semi-circular in cross-section with its locus downstream. In this embodiment the divider 42 meets the wall of the ventilation pipe 40 without needing wings. Although not illustrated, it will be apparent to the skilled reader that the deflector 52 in this embodiment has a complementary shape to the cross-section of the total pressure zone 50, therefore being substantially oval or egg-shaped.

Although the divider 42 has been described as extending parallel to the longitudinal axis of the ventilation pipe 40, it may be not wholly parallel. In one arrangement the first end 44 of the divider 42 may be angled towards the upstream direction to encourage flow to pass into the total pressure zone 50 and to better resemble a total pressure inlet. Alternatively the entire divider 42 may be angled from its first end 44 to its second end 46 so that its first end 44 is further upstream than its second end 46. This has the effect of accelerating the flow through the total pressure zone 50 so that it forms an air curtain to restrict the flow at a lower bypass pressure ratio.

The deflector 52 may also take other forms. It may complement the cross-sectional shape of the total pressure zone 50 as in the embodiments described above. Alternatively the deflector 52 may have a different shape to the total pressure zone 50, for example be semi-circular when the total pressure zone 50 is semi-annular in cross-section. The deflector 52 may alternatively be angled relative to the radius of the ventilation pipe 40, towards or away from the fire zone z3. In particular, it may be beneficial to angle the deflector 52 so that its free end is further from the fire zone z3 than the end coupled to the downstream wall of the ventilation pipe 40. In this configuration the flow from the total pressure zone 50 travels in an arc across the ventilation pipe 40 and, at a large enough pressure differential, reaches the upstream wall of the ventilation pipe 40 approximately perpendicularly, thereby better restricting flow from the static pressure zone 48 into the fire zone z3.

Figure 8:
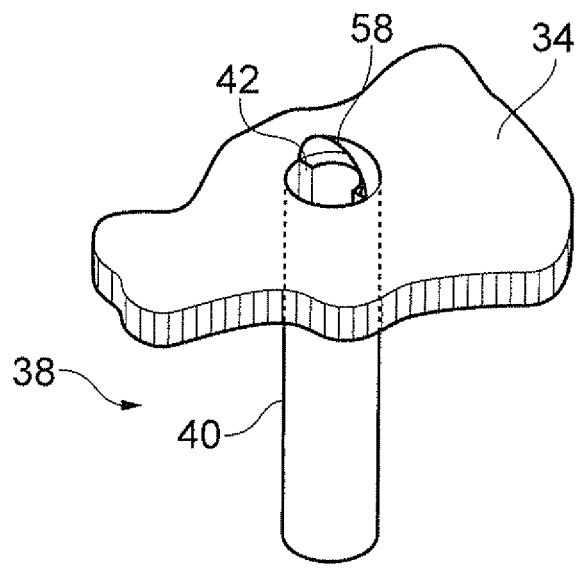
FIG. 8 is a perspective view of an alternative ventilation inlet according to the present invention.

FIG. 8 shows a further alternative embodiment of the ventilation inlet 38 of the present invention. The ventilation pipe 40 remains as in the previous embodiments and includes a divider 42 and a deflector 52 having any of the forms discussed herein. In this embodiment the first end 44 of the divider 42 may be level with the top of the ventilation pipe 40, at its junction with the inner wall 34. In order to divert some of the bypass flow into the ventilation inlet 38, a hood 58 is provided. The hood 58 extends from the downstream periphery of the ventilation pipe 40 into the bypass duct 32 from the inner wall 34. The hood 58 is partially spherical, for example quarter-spherical. Advantageously, the hood 58 captures and diverts some of the bypass flow into the ventilation inlet 38 although there may be a small degradation of the engine 10 performance caused by drag on the bypass flow as it passes the hood 58.

Although the ventilation pipe 40 has been described as cylindrical it may have any other shape suitable for a pressure tapping. For example it may be teardrop-shaped in cross-section, with the bulbous end upstream or downstream of the pointed end depending on the particular application. Alternatively, the ventilation pipe 40 may have any other cross-sectional shape such as square, rectangular or another polygon. The shapes of the divider 42 and the deflector 52 may be similarly adjusted.

Figure 9:
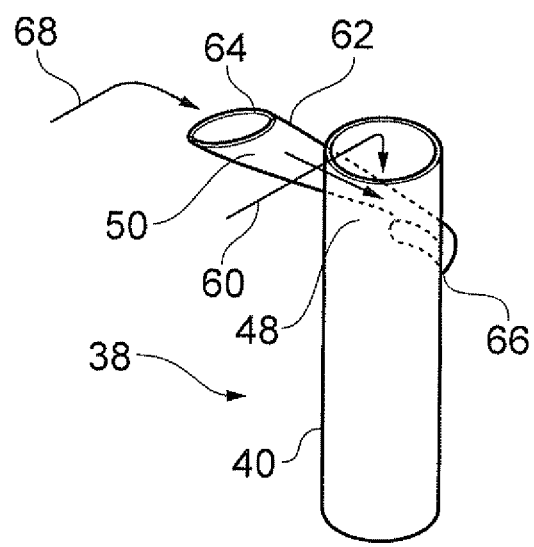
FIG. 9 is a perspective view of a further alternative ventilation inlet according to the present invention.
Figure 10:
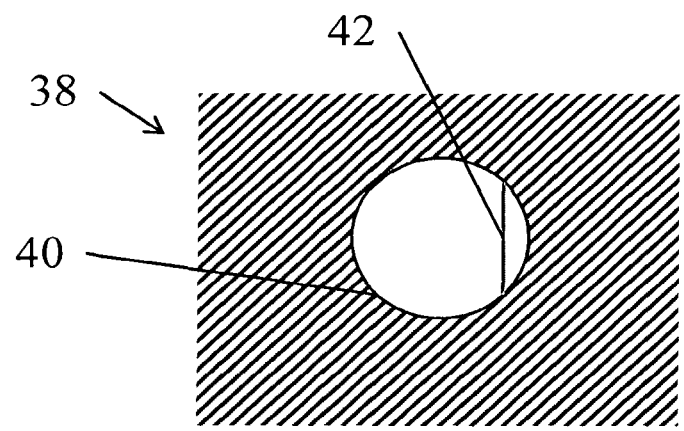
FIG. 10 is a plan view of an alternative ventilation inlet.
Figure 11:
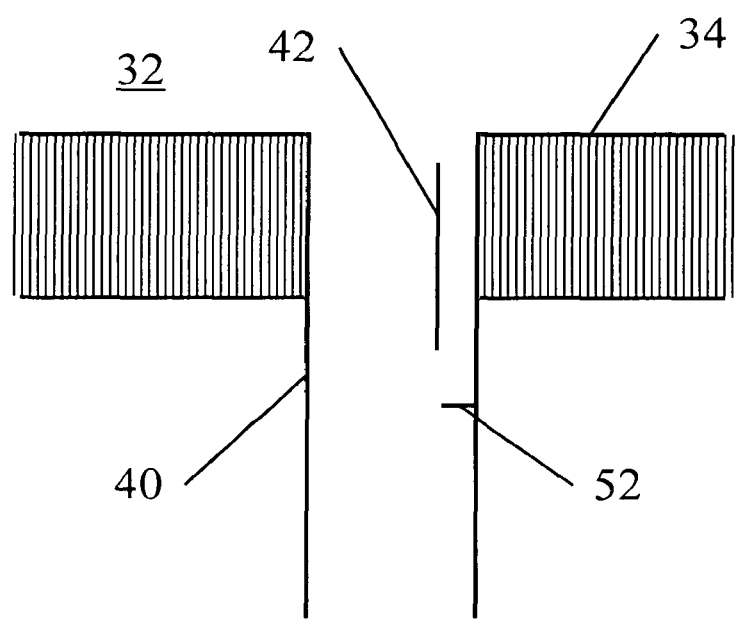
FIGS. 11, 12 and 13 are sectional views of alternative ventilation inlets.
Figure 12:
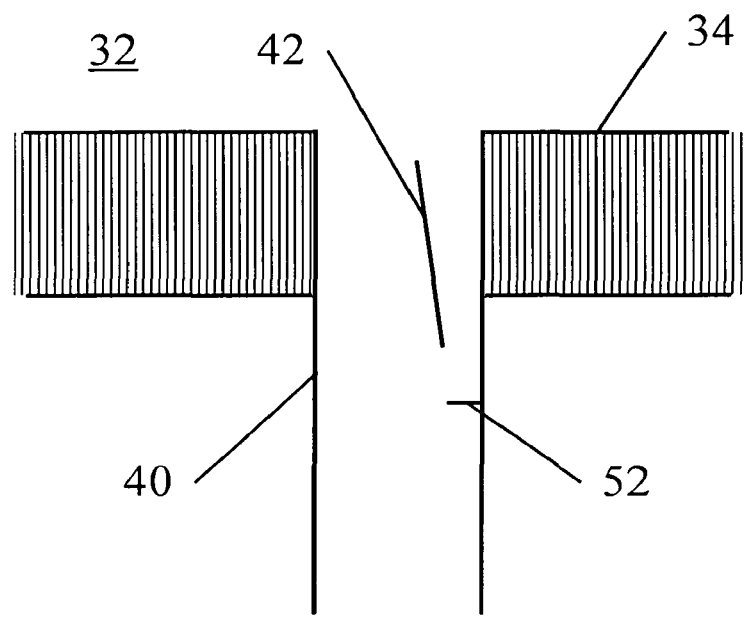
Figure 13:
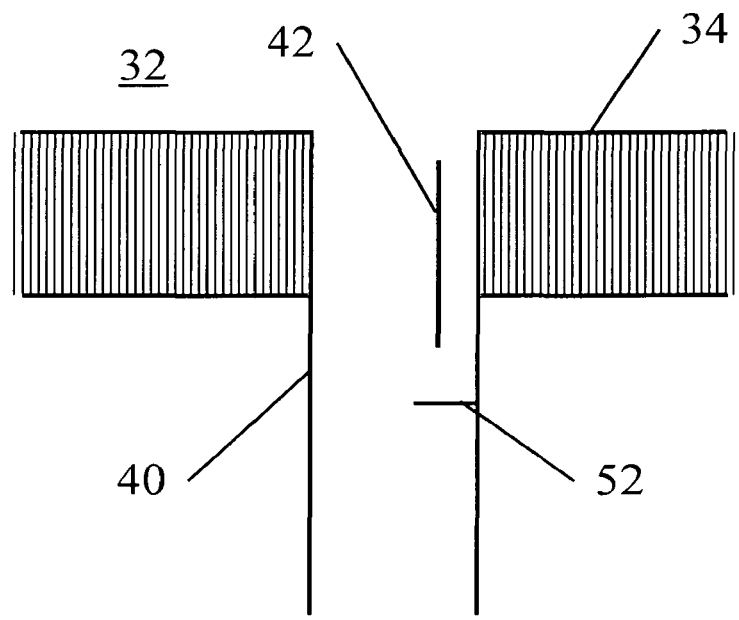

FIG. 9 shows an alternative method of modifying an extant ventilation inlet 38 in accordance with the present invention. In this embodiment the ventilation pipe 40 is a simple cylindrical tube that receives flow at static pressure as indicated by arrow 60. A further pipe 62 is provided that has a first end 64 configured as a total pressure inlet to receive total pressure flow 68 at a location proximal to the ventilation pipe 40 inlet. The further pipe 62 has a second end 66 that is coupled to the ventilation pipe 40 via an aperture in its downstream wall. Thus the further pipe 62 forms the total pressure zone 50 whilst the ventilation pipe 40 forms the static pressure zone 48. As in the earlier embodiments, the rate of flow through the further pipe 62 is dependent on the rate of bypass flow. In turn this governs the force of the air curtain jetted from the second end 66 of the further pipe 62 and the amount of restriction of the ventilation inlet 38 provided. This arrangement therefore acts in the same manner as the other embodiments of the invention. FIG. 10 shows an alternative ventilation inlet 38 in which the deflector protrudes into the ventilation pipe 40 from a wall close to the total pressure zone and is spaced from the end of the divider 42. FIGS. 11, 12 and 13 are sectional views of alternative ventilation inlets. FIG. 11 shows and divider 42 that extends towards but does not meet the end of the ventilation pipe 40 close to the first flow zone. FIG. 12 shows a fire zone ventilation inlet. FIG. 13 shows a deflector 52 that protrudes further into the static pressure zone than the divider 42.

Advantageously, the ventilation inlet 38 of the present invention is a simple configuration comprising minimal parts. Thus it generates fewer losses of acoustic area than alternative, more complex solutions to the problem of diverting ventilation fluid to a cavity from a flow having different pressures and flow rates at different conditions.

Although the ventilation inlet 38 of the present invention has been described with respect to providing ventilation and purge flow to fire zone z3 from the bypass duct 32 of a gas turbine engine 10, other applications are within the scope of the claimed invention. For example, the ventilation inlet 38 can be used to cool other portions of a gas turbine engine 10, such as an engine electronic controller, or to provide heat to areas such as to de-ice the nacelle 30 near the air intake 12, particularly on engine starting. Alternatively, the ventilation inlet 38 can be used with equal felicity to ventilate or purge aircraft cavities such as an electronics bay, or to cool cavities in power plants including nuclear power plants.

The invention claimed is:

1. A ventilation inlet comprising
a ventilation pipe to receive flow from a first flow zone and to deliver the flow to a second flow zone;
a divider arranged to divide a portion of the ventilation pipe into a static pressure zone and a total pressure zone; and
a deflector arranged to direct flow from the total pressure zone at least partially across the static pressure zone to restrict delivery of the flow from the static pressure zone to the second flow zone dependent on the pressure of the flow in the first flow zone.

2. A ventilation inlet as claimed in claim 1 wherein the flow is ventilation flow.

3. A ventilation inlet as claimed in claim 1 wherein the ventilation pipe is circular in cross-section.

4. A ventilation inlet as claimed in claim 3 wherein the divider is semi-circular in cross-section and has complementary shape to the ventilation pipe wall in the total pressure zone.

5. A ventilation inlet as claimed in claim 1 wherein the divider is semi-circular in cross-section.

6. A ventilation inlet as claimed in claim 1 wherein the divider is straight in cross-section.

7. A ventilation inlet as claimed in claim 1 wherein the divider is angled at its end close to the first flow zone.

8. A ventilation inlet as claimed in claim 1 wherein the divider is angled from its end close to the first flow zone to its other end.

9. A ventilation inlet as claimed in claim 1 wherein the divider extends towards but does not meet the end of the ventilation pipe close to the first flow zone.

10. A ventilation inlet as claimed in claim 1 wherein the deflector protrudes into the ventilation pipe from a wall close to the total pressure zone and is spaced from the end of the divider.

11. A ventilation inlet as claimed in claim 10 wherein the deflector protrudes further into the static pressure zone than the divider.

12. A ventilation inlet as claimed in claim 1 further comprising a fire zone ventilation inlet.

13. A gas turbine engine comprising a ventilation inlet as claimed in claim 1, wherein the first flow zone comprises a bypass flow duct.

* * * * *